(12) United States Patent
Reznik et al.

(10) Patent No.: US 12,189,785 B1
(45) Date of Patent: Jan. 7, 2025

(54) SYSTEM AND METHOD FOR PROVIDING THIRD PARTY COMPLIANCE TO COMPUTER AND SOFTWARE ENVIRONMENTS

(71) Applicant: Wiz, Inc., New York, NY (US)

(72) Inventors: Roy Reznik, Tel Aviv (IL); Mattan Shalev, Tel Aviv (IL); Avihai Berkovitz, Tel Aviv (IL); Erez Eyal, Tel Aviv (IL); Ami Luttwak, Binyamina (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 18/397,544

(22) Filed: Dec. 27, 2023

Related U.S. Application Data (60) Provisional application No. 63/592,752, filed on Oct. 24, 2023.

(51) Int. Cl.
*G06F 21/57* (2013.01)
*G06Q 10/0875* (2023.01)

(52) U.S. Cl.
CPC ....... *G06F 21/577* (2013.01); *G06Q 10/0875* (2013.01); *G06F 2221/034* (2013.01); *G06F 2221/2139* (2013.01)

(58) Field of Classification Search
None
See application file for complete search history.

(56) References Cited

U.S. PATENT DOCUMENTS

| | | | |
|---|---|---|---|
| 9,971,880 B2 * | 5/2018 | Ferris | G06F 21/105 |
| 10,438,001 B1 | 10/2019 | Hariprasad | |
| 11,080,718 B2 | 8/2021 | Wiig et al. | |
| 2020/0228415 A1 * | 7/2020 | Rajagopalan | H04L 41/40 |
| 2020/0412767 A1 | 12/2020 | Crabtree et al. | |
| 2021/0141924 A1 * | 5/2021 | Gorman | G06F 21/6245 |
| 2024/0195838 A1 * | 6/2024 | Dimmler | H04L 63/20 |

* cited by examiner

*Primary Examiner* — Fatoumata Traore
(74) *Attorney, Agent, or Firm* — M&B IP Analysts, LLC (57) ABSTRACT

A system and method for providing third party compliance to computing environments without providing access thereto. The method includes: generating a representation of the computing environment, the computing environment including a plurality of identities; generating a software inventory of the computing environment utilizing a cybersecurity inspection technique; determining compliance of the computing environment based on the representation and the software inventory; and providing the determined compliance to a third party, wherein the third party is not associated with the plurality of identities.

25 Claims, 5 Drawing Sheets

SYSTEM AND METHOD FOR PROVIDING THIRD PARTY COMPLIANCE TO COMPUTER AND SOFTWARE ENVIRONMENTS

CROSS-REFERENCE TO RELATED APPLICATIONS

This application claims the benefit of U.S. Provisional Application No. 63/592,752 filed Oct. 24, 2023, the entire contents of which are incorporated by reference herein.

TECHNICAL FIELD

The present disclosure relates generally to cybersecurity, and specifically to providing digital trust and compliance to computer and software environments without the need to provide direct access to the environments to a third party auditor for compliance auditing purposes.

BACKGROUND

Cloud environments provide significant value in the areas of scalability and software integration across the environment. However, in any enterprise cloud environment, it is essential that devices within the cloud maintain compliance with organizational policies. Maintaining compliance with said policies ensures that the environment is better secured from potential intruders, malicious actors, harmful software, and human derived error.

In maintaining compliance policies, enterprises will often seek out third party services to provide auditing functions and reporting on compliance status.

These third party auditors often require access to the cloud environment. Providing access typically requires creation of an identity within the cloud environment for the third party to use. Additionally, the third party often requires a human to physically perform inspection services when automated compliance monitoring is not available.

Furthermore, it is cumbersome to consistently scan cloud environments to detect non-compliant environments, as the monitoring and auditing often requires human intervention or computationally expensive automated monitoring services be used. Additionally, a list of known and allowable software installation policies is necessary in order to create a base line for establishing compliance.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include generating a representation of the computing environment, the computing environment including a plurality of identities. Method may also include generating a software inventory of the computing environment utilizing a cybersecurity inspection technique. Method may furthermore include determining compliance of the computing environment based on the representation and the software inventory. Method may in addition include providing the determined compliance to a third party, where the third party is not associated with the plurality of identities. Other embodiments of this aspect include corresponding computer systems, apparatus, and computer programs recorded on one or more computer storage devices, each configured to perform the actions of the methods.

Implementations may include one or more of the following features. Method may include: determining compliance continuously. Method may include: executing a database query on any one of: the representation of the computing environment, the software inventory, and a combination thereof. Method may include: receiving the query from the third party. Method may include: receiving a natural language query; and generating the database query based on the natural language query. Method may include: generating the database query further based on a large language model (LLM), the LLM trained on any one of: the security database, the software inventory, and a combination thereof. Method may include: generating an alert in response to determining that the executed query returns a predetermined result. Method may include: generating a notification of compliance in response to determining that the executed query returns a second predetermined result. Method may include: initiating inspection for each of a plurality of workloads in the computing environment. Method may include: inspecting a first workload of the plurality of workloads for any one of: a cybersecurity object, a cybersecurity threat, a software component, a software application, a software metadata, and a combination thereof. Method may include: generating a software bill of materials based on inspecting the first workload. Method may include: further determining compliance based on a predefined service level agreement (SLA). Method where the SLA includes a metric value. Method may include: generating a cloud metric value based on the representation and the inventory; and further determining compliance by comparing the generated cloud metric value to the SLA metric value. Implementations of the described techniques may include hardware, a method or process, or a computer tangible medium.

In one general aspect, non-transitory computer-readable medium may include one or more instructions that, when executed by one or more processors of a device, cause the device to: generate a representation of the computing environment, the computing environment including a plurality of identities. Medium may furthermore generate a software inventory of the computing environment utilizing a cybersecurity inspection technique. Medium may in addition determine compliance of the computing environment based on the representation and the software inventory. Medium may moreover provide the determined compliance to a third party, where the third party is not associated with the plurality of identities. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: generate a representation of the computing environment, the computing environment including a plurality of identities. System may in addition generate a software inventory of the computing environment utilizing a cybersecurity inspection technique. System may moreover determine compliance of the computing environment based on the representation and the software inventory. System may also provide the determined compliance to a third party, where the third party is not associated with the plurality of identities. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: determine compliance continuously. System where the memory contains further instructions which when executed by the processing circuitry further configure the system to: execute a database query on any one of: the representation of the computing environment, the software inventory, and a combination thereof. System where the memory contains further instructions which when executed by the processing circuitry further configure the system to: receive the query from the third party. System where the memory contains further instructions which when executed by the processing circuitry further configure the system to: receive a natural language query; and generate the database query based on the natural language query. System where the memory contains further instructions which when executed by the processing circuitry further configure the system to: generate the database query further based on a large language model (LLM), the LLM trained on any one of: the security database, the software inventory, and a combination thereof. System where the memory contains further instructions which when executed by the processing circuitry further configure the system to: generate an alert in response to determining that the executed query returns a predetermined result. System where the memory contains further instructions which when executed by the processing circuitry further configure the system to: generate a notification of compliance in response to determining that the executed query returns a second predetermined result. System where the memory contains further instructions which when executed by the processing circuitry further configure the system to: initiate inspection for each of a plurality of workloads in the computing environment. System where the memory contains further instructions which when executed by the processing circuitry further configure the system to: inspect a first workload of the plurality of workloads for any one of: a cybersecurity object, a cybersecurity threat, a software component, a software application, a software metadata, and a combination thereof. System where the memory contains further instructions which when executed by the processing circuitry further configure the system to: generate a software bill of materials based on inspecting the first workload. System where the memory contains further instructions which when executed by the processing circuitry further configure the system to: further determine compliance based on a predefined service level agreement (SLA). System where the SLA includes a metric value. System where the memory contains further instructions which when executed by the processing circuitry further configure the system to: generate a cloud metric value based on the representation and the inventory, and further determine compliance by comparing the generated cloud metric value to the SLA metric value. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for providing cybersecurity visibility into a computing environment for external devices. In an embodiment, a device, user account, and the like, which is external to a computing environment, is authorized to place a constraint, a policy, and the like, on the computing environment, to determine if the computing environment complies with the policy. According to an embodiment, a policy is placed on the computing environment without providing the external entity access to the computing environment or to a cybersecurity monitoring environment (e.g., an inspection environment) of the same. This is beneficial as it allows to determine compliance with a policy without providing access to the computing environment, without providing access to a representation of the computing environment, and the like, thus preserving the cybersecurity level of the computing environment, without allowing an external entity access, and all the risks doing so would entail.

Figure 1:
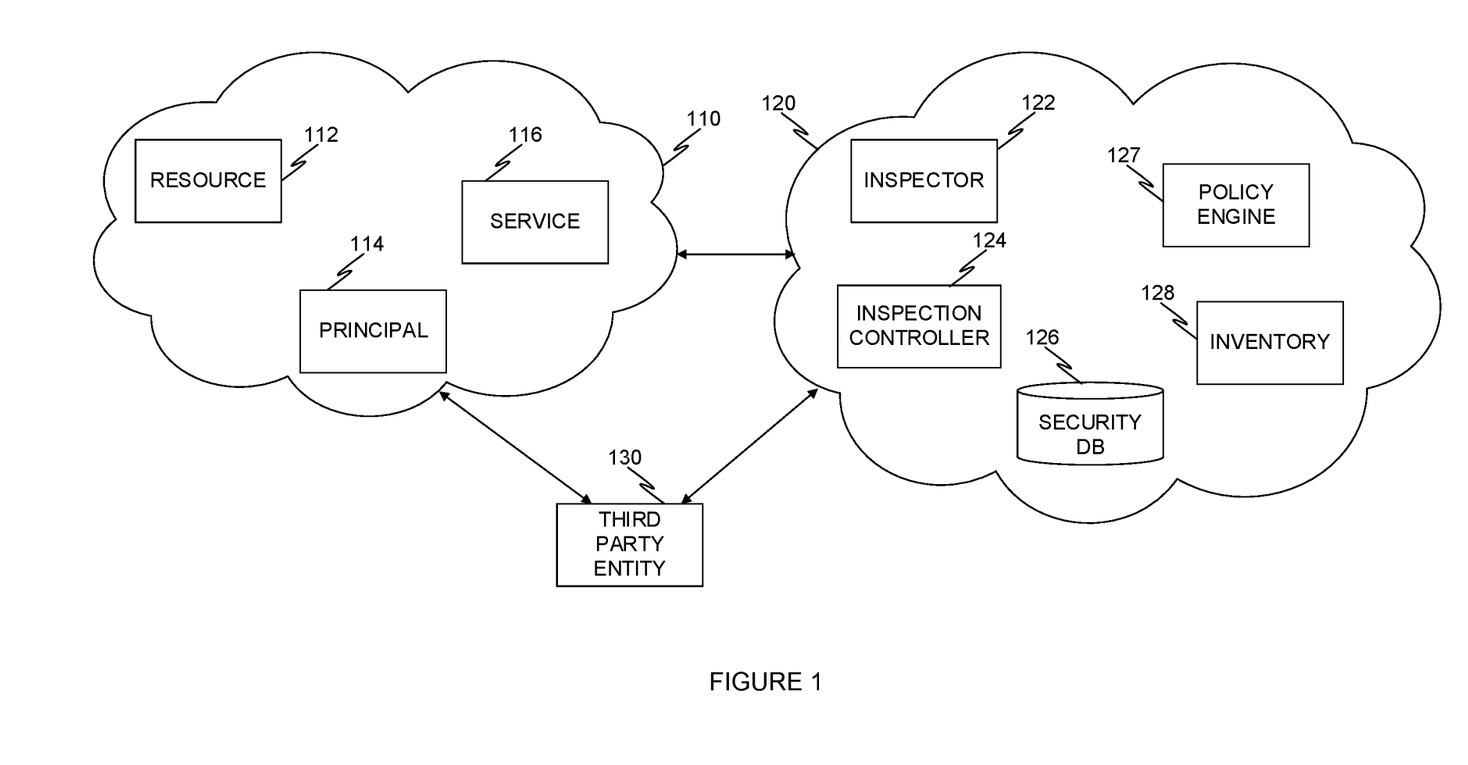
FIG. 1 is an example schematic illustration of a network diagram of a cloud computing environment and an inspection environment, utilized to describe an embodiment.

FIG. 1 is an example schematic illustration of a network diagram of a cloud computing environment and an inspection environment, utilized to describe an embodiment. In an embodiment, a cloud computing environment 110 includes a plurality of resources such as resource 112, a plurality of principals, such as a principal 114, and a plurality of services, such as service 116.

While this example discusses a cloud computing environment, it is evident other computing environments can utilize the teachings herein, including networked computing environments, production computing environments, hybrid computing environments, staging environments, test environments, development environments, combinations thereof, and the like.

In an embodiment, a cloud computing environment 110 is implemented as a cloud computing environment, such as a virtual private cloud (VPC), a virtual network (VNet), a combination thereof, and the like. In certain embodiments, a cloud computing environment is implemented on a cloud computing infrastructure, such as Amazon® Web Services (AWS), Microsoft® Azure, Google® Cloud Platform (GCP), a combination thereof, and the like.

In certain embodiments, a resource 112 is, for example, a workload, a virtual machine, a software container, a serverless function, a processor, a memory, a storage, a combination thereof, and the like. In an embodiment, a resource 112 is a cloud entity which is configured to perform an action in a cloud computing environment.

In an embodiment, a virtual resource is a cloud entity which provides a service, access to a service, provisioning of hardware, and the like, such as a virtual machine, a software container, a serverless function, and the like. In certain embodiments, a principal is a cloud entity which is authorized to act on a resource. For example, according to an embodiment, a principal is a user account, a service account, a role, a combination thereof, and the like.

In some embodiments, a principal 114 is a user account, a service account, a role, a combination thereof, and the like. In an embodiment, a principal 114 is a cloud entity which is authorized to initiate an action in a cloud computing environment, act on a resource 112, and the like.

According to an embodiment, a service 116 is a cloud computing service, such as a software as a service, a microservice, an application program interface (API), a combination thereof, and the like. In some embodiments, a cloud service 116 includes an infrastructure, a platform, a software, and the like, which are provided by a third party, i.e., a party which is not the production environment 110.

For example, in an embodiment, a cloud computing environment 110 receives a software as a service (SaaS) from Salesforce®. In such an embodiment, the SaaS provided to the cloud computing environment 110 from Salesforce is a service 116.

In an embodiment, an inspection environment 120 includes an inspector 122, a policy engine 127, an inspection controller 124, a security database 126, and a software inventory 128. In an embodiment, the security database 126 is implemented as a graph database. In certain embodiments, the software inventory 128 includes a plurality of identifiers, each identifier corresponding to software detected using a cybersecurity inspection technique on the cloud computing environment 110.

In an embodiment, the inspection environment 120 is configured to inspect for cybersecurity objects and generate a representation of a cloud computing environment 110. In some embodiments, the inspection environment 120 consists of a plurality of inspectors, such as inspector 122, which is configured to receive configuration information from an inspection controller 124 and is configured to inspect the cloud computing environment 110.

In some embodiments, an inspector 122 is configured to detect a cybersecurity object, a vulnerability, a misconfiguration, an exposure, a malware object, a combination thereof, and the like. In an embodiment, a cybersecurity object is a code object, an application, an operating system, a library, a binary file, a registry file, a password, a certificate, an encryption key, a credential, a combination thereof, and the like. An implementation of an inspector 122 according to an embodiment is discussed in more detail with respect to FIG. 5 below.

In an embodiment, an inspection controller 124 is configured to initiate inspection of a computing environment, such as production environment 110, for cybersecurity objects. In some embodiments, the inspection controller 124 is configured to detect entities, such as resources, workloads, and the like, in a computing environment, and determine which entities should be inspected, when to initiate inspection of the determined entities, what to inspect the determined entities for, and so on.

In an embodiment, an inspection controller 124 is configured to initiate a plurality of inspector workloads, each inspector configured to inspect a resource for a different cybersecurity object. In some embodiments, the inspection controller 124, the inspector 122, and the like, is configured to initiate inspection of a disk associated with a resource deployed in the production environment 110.

For example, according to an embodiment, the resource 112 is a virtual machine having a disk associated therewith. The inspection controller 124 is configured, in such an embodiment, to generate an inspectable disk based on the disk of the virtual machine, and inspect the inspectable disk for a cybersecurity object.

In some embodiments, generating an inspectable disk includes generating a copy, a clone, a snapshot, and the like, of the disk in the production environment 110. In an embodiment, inspecting an inspectable disk for a cybersecurity object is advantageous as it reduces resource requirements from the production environment.

In certain embodiments, a policy engine 127 includes a policy, a rule, a conditional rule, a service level agreement (SLA), a combination thereof, and the like. In an embodiment, a policy engine 127 applies a policy, a conditional rule, an SLA, a combination thereof, and the like, to a representation of the production environment 110 which is stored in the security database 126.

In some embodiments, the policy engine 127 is configured to receive policies, rules, conditional rules, SLAs, combinations thereof, and the like, from a third party entity 130, discussed in more detail below.

In an embodiment, a security database 126 is queried based on a policy, a rule, a conditional rule, an SLA, a combination thereof, and the like. In certain embodiments, the policy engine 127 is configured to periodically query the security database 126.

In certain embodiments, the security database 126 is configured to store a representation of a computing environment, such as the production environment 110. In an embodiment, the representation is generated by populating the security database 126 with data, information, enrichments, a combination thereof, and the like. In some embodiments, the security database 126 includes a data schema, such as a unified data schema.

A unified data schema is advantageous in some embodiments, as it allows representing entities, such as resources, principals, and the like, utilizing a single schema. For example, a unified data schema includes a single data template for representing virtual machines, regardless of what type of virtual machine is represented, in what environment the virtual machine is deployed (e.g., AWS, GCP, Azure, etc.). This allows for a more compact representation and is therefore advantageous, according to certain embodiments.

In an embodiment, the security database 126 is populated with data, information, enrichments, and the like, based on an inspection performed by an inspector 122. For example, according to an embodiment, an inspector 122 detects an encryption key on a disk in the production environment 110. In some embodiments, a representation is generated in the security database 126 for the disk, and another representation is generated in the security database 126 for the encryption key, such that the representations are associated with each other.

In an embodiment, the security database 126 is implemented as a graph database, such as Node4j®. In certain embodiments, a graph database is configured to store thereon a security graph, such that resources, principals, services, and the like, are stored as nodes in the security graph. In certain embodiments, nodes are connected to each other by an edge, a plurality of edges, and the like. In some embodiments, an edge indicates a relationship between two nodes (e.g., parent-child, 'can access', 'includes', etc.).

In certain embodiments, the inspection environment 120 further includes a software inventory 128. In an embodiment, the software inventory 128 includes a software bill-of-materials (SBOM), a representation of a SBOM, and the like. In some embodiments, the software inventory 128 includes a representation of a SBOM, a SBOM, and the like, of the production environment 110. In an embodiment, the SBOM is generated based on information, data, a combination thereof, and the like, provided by an inspector 122.

In certain embodiments, the inspector 122 is configured to detect a software, a library, a binary, a combination thereof, and the like. In an embodiment, in response to detecting a software, a binary, a library, a combination thereof, and the like, a SBOM is updated with an identifier of the same. For example, in response to an inspector 122 detecting a software on a disk, an identifier of the software, a version number, a combination thereof, and the like, is stored in the software inventory 128.

In some embodiments, the policy engine 127 is further configured to apply a policy, a rule, a conditional rule, a combination thereof, and the like, to the SBOM stored in the software inventory 128. In certain embodiments, the policy engine 127 is configured to apply a policy, rule, conditional rule, and the like, to the software inventory 128 and the security database 126.

According to an embodiment, a third party entity 130 is a principal outside of the production cloud environment 110 and inspection cloud environment 120. In an embodiment, the third party entity 130 is authorized to provide the policy engine 127 a query, a policy, a rule, a conditional rule, an SLA, a combination thereof, and the like. In some embodiments, the policy engine 127 is configured to execute the query, apply the policy, etc.

For example, in an embodiment, the policy engine 127 is configured to receive a query, a statement, an SLA, and the like, from the third party entity 130, and generate a query for the security database 126. In an embodiment, the policy engine 127 is configured to receive a query result indicating that the production cloud environment 110 is compliant, that the production environment 110 is non-compliant, and the like.

For example, in an embodiment, a third party entity 130 provides a policy engine 127 with a plurality of statements, policies, rules, conditional rules, SLAs, a combination thereof, and the like. The policy engine 127 applies the statements, policies, rules, etc. on a representation of the production environment 110, for example stored in the security database 126, stored in the software inventory 128, a combination thereof, and the like.

In an embodiment, the policy engine 127 is further configured to determine if the production environment 110 is compliant with the received statement, policy, rule, etc. For example, where a conditional rule states that all databases must have a strong password, and an inspector detects a workload having a database thereon which includes a weak password, the production environment 110 is considered non-compliant with the conditional rule.

Figure 2:
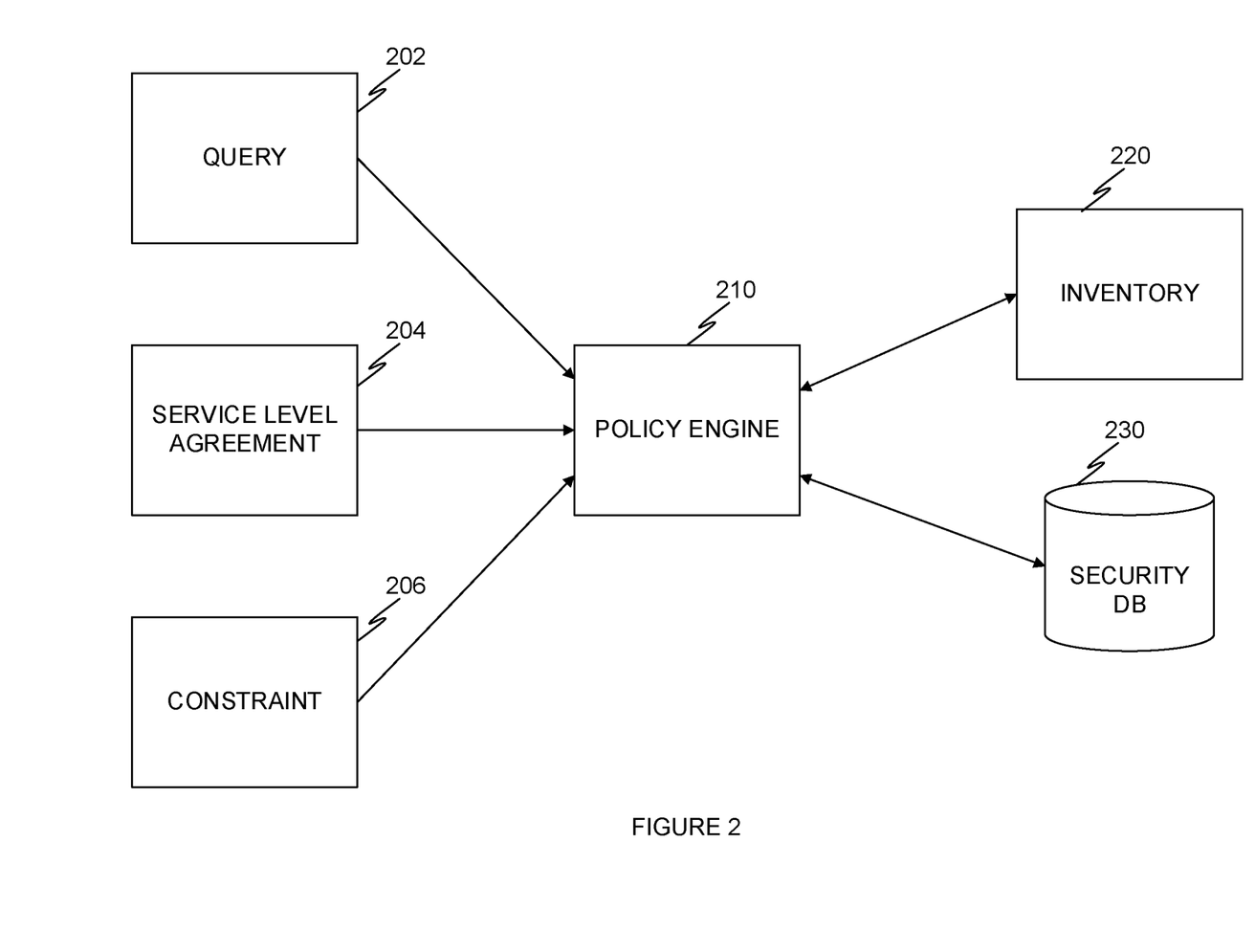
FIG. 2 is an example schematic diagram of a policy engine, implemented in accordance with an embodiment.

FIG. 2 is an example schematic diagram of a policy engine, implemented in accordance with an embodiment. In an embodiment, a policy engine 210 is configured to receive an input, such as a query 202, a service level agreement 204, a constraint 206, a combination thereof, and the like. In an embodiment, the policy engine 210 is configured to scan of a software inventory 220, a security database 230, a combination thereof, and the like. In an embodiment, the software inventory 220, the security database 230, and the like, include a representation of a computing environment, for example as described in FIG. 1, for non-compliance.

In an embodiment, the query 202, is: a structured query language query, a natural language query, a combination thereof, and the like. In some embodiments, the query 202 includes a statement, such as a natural language statement.

In some embodiments, the received query will be further generated by a large language model (LLM), the LLM having been trained on any one of: the security database 230, the software inventory 220, a combination thereof, and the like.

In certain embodiments, the LLM is trained using one or more methods, such as: reinforcement learning, supervised learning, unsupervised learning, a combination thereof, and the like.

In an embodiment, the LLM is trained on a data model. The model data consists of one or more of the following: the entirety of the security database 230, the entirety of the software inventory 220, a subset of the security database 230, a subset of the software inventory 220, a combination thereof, and the like.

In an embodiment, a constraint is, for example: a limitation on the scope of a query, a specific term or terms which should be used to build an executable query, query predicates, a combination thereof, and the like.

Figure 3:
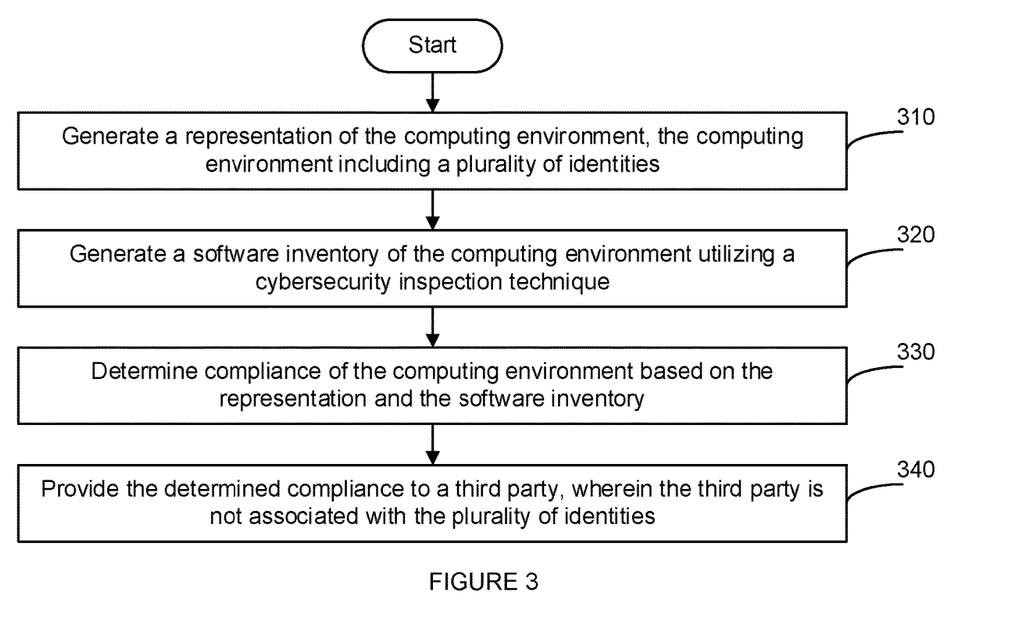
FIG. 3 is an example flowchart of a method for determining compliance of a cloud computing environment, according to an embodiment.

FIG. 3 is an example flowchart of a method for determining compliance of a cloud computing environment, according to an embodiment.

At S310 a representation of a cloud computing environment is generated. In an embodiment, the representation of the environment includes a plurality of identities.

In an embodiment, the representation of the cloud computing environment is generated by an inspector. In some embodiments, the inspector is configured to inspect for a cybersecurity object and generate a representation of a cloud computing environment by storing detected data in a security database.

According to an embodiment, the inspection controller is deployed in an inspection environment, wherein the inspection controller configured to provision inspector workloads, initiating inspections of computing environments, and the like.

In an embodiment, an identity within the plurality of identities is any one of: a user account, an administrator account, a service account, a network level account, and the like.

At S320, a software inventory of the computing environment is generated. In an embodiment, the software inventory is generated utilizing a cybersecurity inspection technique. According to an embodiment, the inspection is performed by an inspector configured to inspect the computing environment. In an embodiment, inspection is utilized to create or update a software inventory housing a record of detected software present within the inspected environment.

In an embodiment, the software inventory includes a software bill-of-materials (SBOM), a representation of an SBOM, and the like. In some embodiments, the software inventory includes a representation of a SBOM, a SBOM, and the like, of the production environment. In an embodiment, the SBOM is generated based on information, data, a combination thereof, and the like, detected by an inspector.

In certain embodiments, the inspector is configured to detect a software, a library, a binary, a combination thereof, and the like. In an embodiment, in response to detecting a software, a binary, a library, a combination thereof, and the like, a SBOM is updated with an identifier of the same. For example, in response to an inspector detecting a software on a disk, an identifier of the software, a version number, a combination thereof, and the like, is stored in the software inventory.

At S330, compliance is determined. In an embodiment, compliance is determined of the inspected computing environment, based on an SLA, a policy, a rule, and the like. According to an embodiment, a computing environment is determined to be in compliance if the representation of the environment and the software inventory comply with a policy, an SLA, a rule, a combination thereof, and the like, for example such as provided to a policy engine. In some embodiments, an SLA includes a value, a value range, a combination thereof, and the like. For example, in an embodiment, a policy specifies that a cloud environment having between 0% and 2% of workloads with a vulnerability is compliant.

In an embodiment, a representation of a computing environment contains a plurality of resources, a plurality of services, and a plurality of principals, as expressed in FIG. 1.

In some embodiments, a policy engine is further configured to apply a policy, a rule, a conditional rule, a combination thereof, and the like, to the SBOM stored in the software inventory. In certain embodiments, the policy engine is configured to apply a policy, rule, conditional rule, and the like, to the software inventory and the security database.

For example, in an embodiment, the policy engine is configured to receive a query, a statement, an SLA, and the like, from a third party entity, and generate a query for the security database. In an embodiment, the policy engine is configured to receive a query result indicating that the production cloud environment is compliant, that the production cloud environment is non-compliant, and the like.

At S340, a compliance state is provided to a third party. In an embodiment, a compliance state includes a compliance report, generated, for example, as a result of applying an SLA, a policy, a rule, a combination thereof, and the like, on a representation of a computing environment.

In an embodiment, the compliant state determination is provided to a third party, wherein the third party is not associated with the plurality of identities. In an embodiment, a third party is able to receive a compliance determination without being granted access to the computing environment at question. For example, in an embodiment, a third party is an entity which is not associated with a user, user group, account, role, and the like, of a computing environment. For example, according to an embodiment, the third party entity is a user account which is associated with a first organization, first computing environment, etc., and the first organization, computing environment, and the like, is not associated with the plurality of identities.

According to an embodiment, a third party entity is a principal outside of the production cloud environment and inspection cloud environment.

In an embodiment, a compliant state determination is a query result provided to a policy engine, the policy engine having been configured to receive a query result indicating that the production cloud environment is compliant, non-compliant, and the like, as described in more detail herein.

Figure 4:
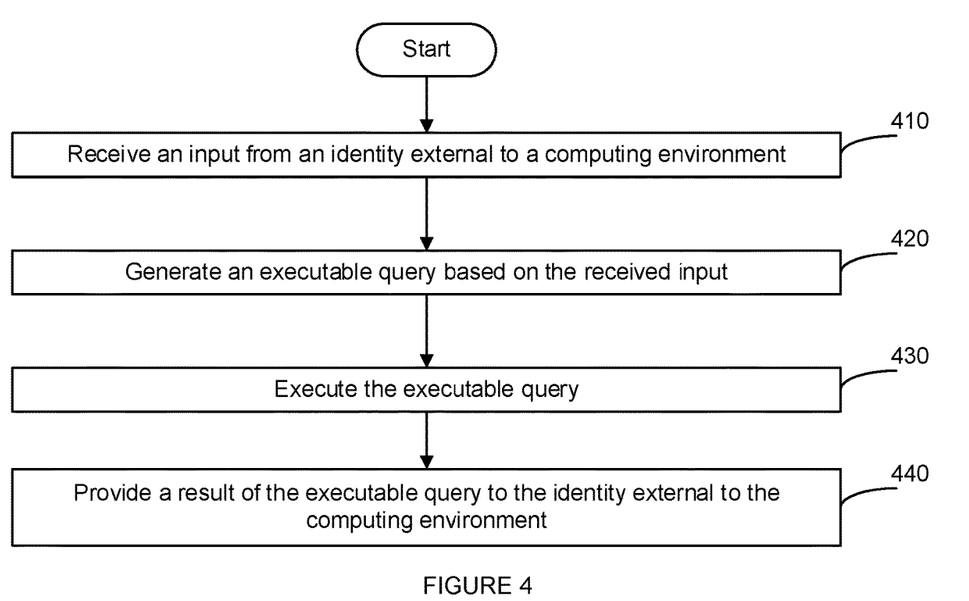
FIG. 4 is an example flowchart of a method allowing an identity external to a computing environment (commonly called a third party identity) to query said environment and receive a result according to an embodiment.

FIG. 4 is an example flowchart of a method allowing an identity external to a computing environment (commonly called a third party identity) to query said environment and receive a result according to an embodiment.

At S410, an input is received. In an embodiment, the input is received from an identity external to a computing environment, such as a third party identity. In an embodiment, a cloud computing environment includes a plurality of principals. In some embodiments, the principals includes a plurality of identities. In an embodiment, an identity not contained within the plurality of identities is deemed to be an external identity. Third party identity, etc.

In some embodiments, the input includes a policy, a rule, an SLA, a structured query for processing by a computer system, a natural language query, and the like. For example, in an embodiment, a third party identity provides an SLA as an input, where the SLA includes a plurality of policies, rules, and the like.

At S420, an executable query is generated. In an embodiment, the executable query is generated based on the input received from an external identity. In an embodiment, the input received includes a query, a service level agreement, a constraint, a combination thereof, and the like. An executable query is discussed in more detail in FIG. 2 above. In an embodiment, a constraint is, for example: a limitation on the scope of a query, a specific term or terms which should be used to build an executable query, query predicates, a combination thereof, and the like.

According to an embodiment, the query is a structured query language query, a natural language query, a combination thereof, and the like. In some embodiments, the query includes a statement, such as a natural language statement. In some embodiments, the received query is further generated by a large language model (LLM), as discussed in more detail herein.

At S430, the executable query is executed. In an embodiment, the executable query is executed by a policy engine. According to an embodiment, execution of the executable query by the policy engine generates a query result. In some embodiments, a query is executable where the query can be provided to a computing system, such as a database management system (DBMS) for execution by the computing system, for example on a processor thereof. In an embodiment, the executable query, when executed, causes a computing system to generate a result based on the executable query.

At S440, a result is provided to the external entity. In an embodiment, the result of the executable query is returned to the identity external to the computing environment (e.g., the third party identity). In an embodiment, the result indicates compliance of a computing environment based on an SLA, a policy, a rule, a statement, and the like. For example, according to an embodiment, a computing environment can be either compliant or non-compliant with respect to an SLA, a policy, a rule, a statement, a combination thereof, and the like.

In some embodiments, the result indicates that the computing environment is in a state of compliance. In other embodiments, the result indicates that the computing environment is in a state of non-compliance.

In certain embodiments, a result is provided periodically, in response to periodically executing a query on a representation of the computing environment. In some embodiments, the result includes a report, generated based on a plurality of results, each result generated from executing a query on a security database, wherein the security database includes a representation of the computing environment.

Figure 5:
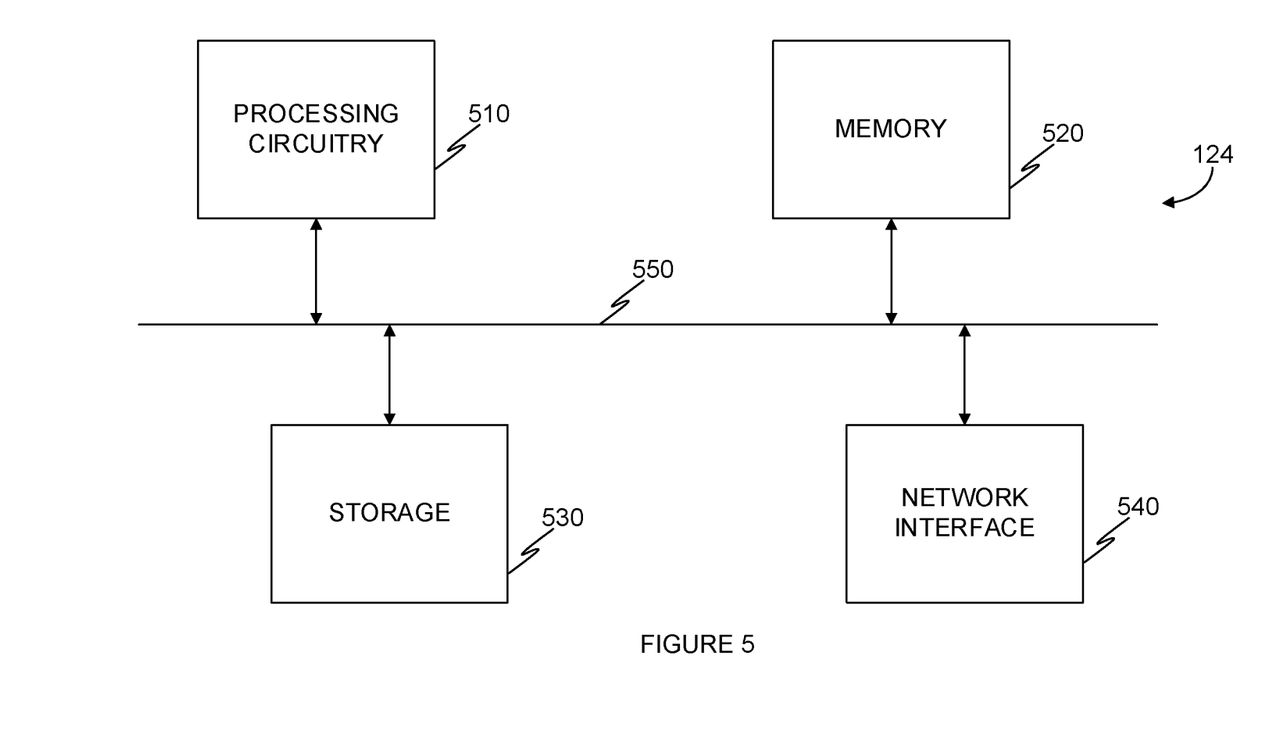
FIG. 5 is an example schematic diagram of an inspection controller according to an embodiment.

FIG. 5 is an example schematic diagram of an inspection controller 124 according to an embodiment. The inspection controller 124 includes a processing circuitry 510 coupled to a memory 520, a storage 530, and a network interface 540. In an embodiment, the components of the inspection controller 124 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof. In an embodiment, the memory 520 is an on-chip memory, an off-chip memory, a combination thereof, and the like. In certain embodiments, the memory 520 is a scratch-pad memory for the processing circuitry 510.

In one configuration, software for implementing one or more embodiments disclosed herein may be stored in the storage 530, in the memory 520, in a combination thereof, and the like. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 is a magnetic storage, an optical storage, a solid-state storage, a combination thereof, and the like, and is realized, according to an embodiment, as a flash memory, as a hard-disk drive, or other memory technology, or any other medium which can be used to store the desired information.

The network interface 540 is configured to provide the inspection controller 124 with communication with, for example, the inspector 122, the security database 126, the policy engine 127, the inventory 128, and the like.

It should be understood that the embodiments described herein are not limited to the specific architecture illustrated in FIG. 5, and other architectures may be equally used without departing from the scope of the disclosed embodiments.

Furthermore, in certain embodiments the inspector 122, the security database 126, the policy engine 127, the inventory 128, and the like, may be implemented with the architecture illustrated in FIG. 5. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for providing third party compliance to computing environments without providing access thereto, comprising:
   generating a representation of the computing environment, the computing environment including a plurality of identities;
   generating a software inventory of the computing environment utilizing a cybersecurity inspection technique;
   executing a database query on any one of the representation of the computing environment, the software inventory, and a combination thereof;
   generating an alert in response to determining that the executed query returns a predetermined result;
   determining compliance of the computing environment based on the representation, the software inventory, and the predetermined result; and
   providing the determined compliance to a third party, wherein the third party is not associated with the plurality of identities.

2. The method of claim 1, further comprising:
   determining compliance continuously.

3. The method of claim 1, further comprising:
   receiving the query from the third party.

4. The method of claim 1, further comprising:
   receiving a natural language query; and
   generating the database query based on the natural language query.

5. The method of claim 4, further comprising:
   generating the database query further based on a large language model (LLM), the LLM trained on any one of: a security database in which the representation is stored, the software inventory, and a combination thereof.

6. The method of claim 1, further comprising:
   generating a notification of compliance in response to determining that the executed query returns a second predetermined result.

7. The method of claim 1, further comprising:
   initiating inspection for each of a plurality of workloads in the computing environment.

8. The method of claim 7, further comprising:
   inspecting a first workload of the plurality of workloads for any one of a cybersecurity object, a cybersecurity threat, a software component, a software application, a software metadata, and a combination thereof.

9. The method of claim 8, further comprising:
   generating a software bill of materials based on inspecting the first workload.

10. The method of claim 1, further comprising:
    further determining compliance based on a predefined service level agreement (SLA).

11. The method of claim 10, wherein the SLA includes a metric value.

12. The method of claim 11, further comprising:
    generating a cloud metric value based on the representation and the inventory; and
    further determining compliance by comparing the generated cloud metric value to the SLA metric value.

13. A non-transitory computer-readable medium storing a set of instructions for providing third party compliance to computing environments without providing access thereto, the set of instructions comprising:
    one or more instructions that, when executed by one or more processors of a device, cause the device to:
       generate a representation of the computing environment, the computing environment including a plurality of identities;
       generate a software inventory of the computing environment utilizing a cybersecurity inspection technique;
       execute a database query on any one of the representation of the computing environment, the software inventory, and a combination thereof;
       generate an alert in response to determining that the executed query returns a predetermined result;
       determine compliance of the computing environment based on the representation, the software inventory, and the predetermined result; and
       provide the determined compliance to a third party, wherein the third party is not associated with the plurality of identities.

14. A system for providing third party compliance to computing environments without providing access thereto comprising:
    a processing circuitry;
    a memory, the memory containing instructions that, when executed by the processing circuitry, configure the system to:
       generate a representation of the computing environment, the computing environment including a plurality of identities;
       generate a software inventory of the computing environment utilizing a cybersecurity inspection technique;
       execute a database query on any one of the representation of the computing environment, the software inventory, and a combination thereof;
       generate an alert in response to determining that the executed query returns a predetermined result;
       determine compliance of the computing environment based on the representation, the software inventory, and the predetermined result; and
       provide the determined compliance to a third party, wherein the third party is not associated with the plurality of identities.

15. The system of claim 14, wherein the memory contains further instructions which when executed by the processing circuitry further configure the system to:
    determine compliance continuously.

16. The system of claim 14, wherein the memory contains further instructions which when executed by the processing circuitry further configure the system to:
    receive the query from the third party.

17. The system of claim 14, wherein the memory contains further instructions which when executed by the processing circuitry further configure the system to:
    receive a natural language query; and
    generate the database query based on the natural language query.

18. The system of claim 17, wherein the memory contains further instructions which when executed by the processing circuitry further configure the system to:
    generate the database query further based on a large language model (LLM), the LLM trained on any one of:
    a security database in which the representation is stored, the software inventory, and a combination thereof.

19. The system of claim 14, wherein the memory contains further instructions which when executed by the processing circuitry further configure the system to:
    generate a notification of compliance in response to determining that the executed query returns a second predetermined result.

20. The system of claim 14, wherein the memory contains further instructions which when executed by the processing circuitry further configure the system to:
  initiate inspection for each of a plurality of workloads in the computing environment.

21. The system of claim 20, wherein the memory contains further instructions which when executed by the processing circuitry further configure the system to:
  inspect a first workload of the plurality of workloads for any one of:
  a cybersecurity object, a cybersecurity threat, a software component, a software application, a software metadata, and a combination thereof.

22. The system of claim 21, wherein the memory contains further instructions which when executed by the processing circuitry further configure the system to:
  generate a software bill of materials based on inspecting the first workload.

23. The system of claim 14, wherein the memory contains further instructions which when executed by the processing circuitry further configure the system to:
  further determine compliance based on a predefined service level agreement (SLA).

24. The system of claim 23, wherein the SLA includes a metric value.

25. The system of claim 24, wherein the memory contains further instructions which when executed by the processing circuitry further configure the system to:
  generate a cloud metric value based on the representation and the inventory; and
  further determine compliance by comparing the generated cloud metric value to the SLA metric value.

\* \* \* \* \*